United States Patent [19]

Rao et al.

[11] Patent Number: 4,959,919
[45] Date of Patent: Oct. 2, 1990

[54] ILLUMINATED FISHING LURE AND BATTERY THEREFOR

[75] Inventors: Bhaskara M. L. Rao, Flemington; James C. Menke, Maplewood; Robert P. Hamlen, Bernardsville, all of N.J.

[73] Assignee: Alupower, Inc., Bernardsville, N.J.

[21] Appl. No.: 164,215

[22] Filed: Mar. 4, 1988

[51] Int. Cl.⁵ ............................................. A01K 85/00
[52] U.S. Cl. .................................................. 43/17.6
[58] Field of Search ................. 43/17.5, 17.6; 429/7, 429/8, 96, 98, 118, 119, 128, 130, 140, 146

[56] References Cited

U.S. PATENT DOCUMENTS

| | | | |
|---|---|---|---|
| 3,317,350 | 5/1967 | Murphy | 429/130 |
| 3,863,380 | 2/1975 | Purlia | 43/17.6 |
| 3,921,328 | 11/1975 | Holcombe | 43/17.6 |
| 3,966,497 | 6/1976 | Honer | 429/119 |
| 4,005,246 | 1/1977 | Schiffer et al. | 429/118 |
| 4,154,906 | 5/1979 | Bubnick et al. | 429/128 |
| 4,601,961 | 7/1986 | McCartney | 429/119 |
| 4,628,420 | 12/1986 | McArthur | 429/118 |

*Primary Examiner*—Kurt Rowan
*Attorney, Agent, or Firm*—Cooper & Dunham

[57] ABSTRACT

A self-illuminated salt water fishing lure including a hollow lure body which is open to receive salt water in which the body is submerged, and which has a light-transmissive wall; an electric light bulb mounted inside the lure body to produce light visible through the transmissive wall; and a battery, which uses salt water as an electrolyte, mounted inside the lure body for energizing the light bulb. The battery has electrodes with a gap between them which is open to receive salt water when the lure is submerged, but is otherwise empty, so that the battery in activated only during submersion of the lure. One suitable type of battery has a manganese dioxide cathode and an aluminum anode, with an interelectrode gap open at both ends so that sea water can flow into, through, and out of the gap to remove reaction products formed while the battery is activated.

7 Claims, 2 Drawing Sheets

ILLUMINATED FISHING LURE AND BATTERY THEREFOR

BACKGROUND OF THE INVENTION

This invention relates to self-illuminated fishing lures, and to batteries having utility in such lures.

A typical fishing lure is a submersible body, having a form and/or other characteristics attractive to fish, arranged to be secured to a fishing line and provided with one or more fish hooks. When dropped or cast into a body of water populated with fish, the lure serves in the same manner as bait to induce a fish to attack it and become engaged by a hook. Many varieties of lures are made and sold, including lures that physically resemble natural prey (e.g., worms, smaller fish, etc.) as well as lures that move or glitter by reflection.

Since fish are known to be attracted to light sources, some lures have been designed to be self-illuminated. A conventional self-illuminated fishing lure comprises or incorporates a "light stick" of the type commercially available under the trade name "Cyalume." A lightstick lure, however, has several disadvantages. Prior to use it must be stored in a light-tight container to prevent deterioration. It must be subjected to a breaking operation, to initiate illumination, before being placed in the water. Once lit, it emits light continuously, whether being used or not, until it is finally depleted. The light discharge does not remain constant but drops off with time and ordinarily lasts for only about 12 hours.

SUMMARY OF THE INVENTION

The present invention broadly contemplates the provision of a fishing lure comprising a fully submersible fishing lure body having a hollow interior open to receive liquid in which the body is submerged, and a light-transmissive wall; an electrically energizable light source disposed within the body interior to produce light visible through the light-transmissive wall; and a battery comprising spaced electrodes mounted in the body interior and electrically connected to the light source, the electrodes being so constituted and arranged that, when the body is submerged in salt water and salt water is received in the interior, the electrodes cooperate with the received salt water as an electrolyte to produce electric current for energizing the light source.

In one suitable form of battery in accordance with the invention, the electrodes comprise a manganese dioxide cathode and an aluminum anode. It will be understood that, as used herein, the term "manganese dioxide cathode" refers to a solid body comprising or containing $MnO_2$ in suitable form to act as a cathode, e.g. $MnO_2$ in mixture with carbon; and the term "aluminum" embraces pure aluminum metal and aluminum-based alloys. In another form of battery for the lure, the electrodes include a plurality of bipolar electrodes in sheet or plate form, arranged in a stack between a cathode sheet and an anode sheet to constitute a plurality of cells with adjacent sheets spaced apart to define interelectrode gaps for receiving salt water as electrolyte.

Further in accordance with the invention, the hollow interior of the lure body is conveniently or preferably a through passage having opposed open ends, and the electrodes cooperatively define at least one interelectrode gap, having opposed open ends, within the passage for permitting flow of the received salt water into, through and out of the gap and the passage to remove therefrom any reaction products formed incident to production of electric current by the battery. The electrodes may comprise an annular cathode structure mounted in the lure body within the passage and a rod-shaped anode, and the battery may further include an electrically nonconductive member secured to the cathode structure and supporting the anode in coaxial spaced relation to the cathode structure, and first and second electrically conductive members respectively connecting the cathode structure and the anode to the light source and cooperatively supporting the light source within the passage. The lure body may be a rigid, hollow, open-ended plastic net tube through which the aforementioned passage extends longitudinally from end to end of the tube.

In these specific embodiments of the lure of the invention, utilizing a manganese dioxide cathode-aluminum anode battery, the anode may be an aluminum rod and the cathode structure may include an annular manganese dioxide cathode mass and a conductive metal jacket externally surrounding and supporting the cathode mass, the jacket being mounted in the lure body and being secured to the aforementioned first conductive member.

The fishing lure of the invention is suitable for use for salt-water fishing; e.g. in the ocean. It does not require shielding from light during storage, since its light source may, for example, be a conventional incandescent light bulb. It has an indefinite shelf life, and does not require any preliminary light-initiating operation, because its battery fills with electrolyte (sea water), and is thereby activated, when but only when the lure is actually submerged in the ocean. Each time the lure is removed from the ocean, the sea water electrolyte drains out and the light turns off. In addition, its total light-discharging lifetime is much longer than that of a light stick, and the level of light emission remains desirably uniform throughout this lifetime.

Although $Al-MnO_2$ cell systems have heretofore been known, their use has been in enclosed batteries additives are preferably incorporated in the electrolyte to minimize aluminum self-discharge and enhance cell stand-life, and the choice of suitable alloys for the anode is restricted to those having low corrosion rates in the electrolytes; moreover, the accumulation of voluminous reaction products formed when the battery is operating has limited the useful cell lifetime. All these disadvantages are overcome in $Al-MnO_2$ batteries in accordance with the present invention, having open-ended interelectrode gaps through which salt water can flow in and out, since the aluminum anodes are exposed to electrolyte only during actual use and the flow of salt water electrolyte flushes reaction products out of the system. Thus, these batteries are economical and effective for energizing lights in the fishing lures of the invention, and have advantages for other uses as well, e.g. in marine environments (immersed in salt water) with lights or other loads to be energized connected between their electrodes.

Further features and advantages of the invention will be apparent from the detailed description hereinbelow set forth, together with the accompanying drawings.

DETAILED DESCRIPTION

Figure 1:
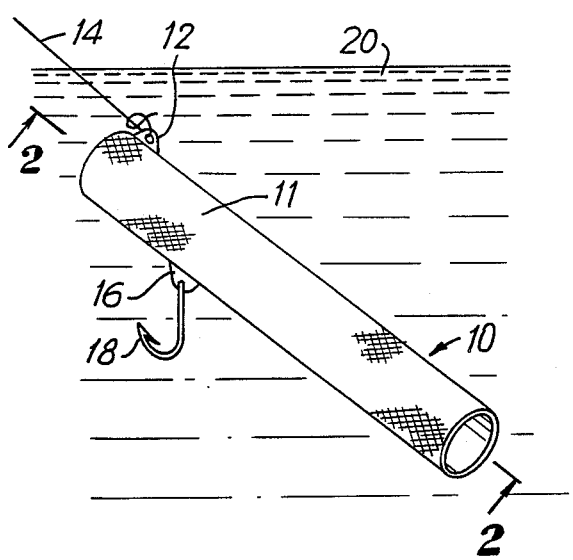
FIG. 1 is a simplified and somewhat schematic perspective view of a fishing lure embodying the present invention in a particular form.

Referring first to FIG. 1, there is shown a self-illuminated salt water fishing lure 10 embodying the present invention. This lure, as viewed externally, is a rigid, open-ended tube, e.g. about 6 inches long and 1 inch in internal diameter, having a light-transmissive tube wall and containing, within its interior, a small incandescent light bulb (not shown in FIG. 1) and a battery for energizing the bulb (also not shown in FIG. 1). The approximate location of the light bulb within the tube is indicated at 11 in FIG. 1. At the forward end of the tube, an eye 12 is provided for attachment of the lure to a fishing line 14, while a second eye 16 projecting from the exterior of the tube adjacent locality 11 provides a mount for one or more depending fish hooks 18.

In use, the lure, at the end of the fishing line 14, is dropped or cast into a body of sea water 20, typically so as to be fully submerged in the sea water. The light emitted by the bulb within the tube, and visible through the tube wall at locality 11, serves to attract fish which may attack the lure and become caught on the hook 18.

Figure 3:
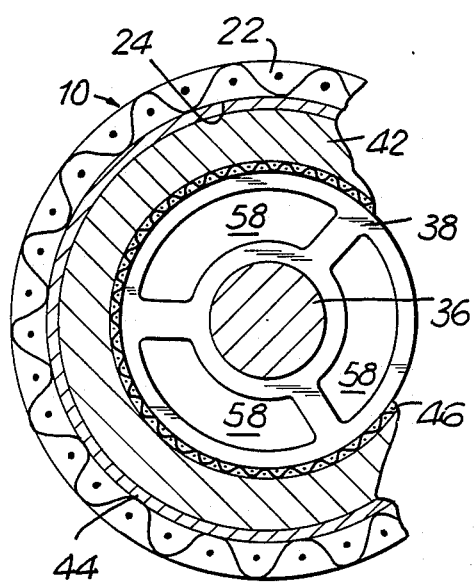
FIG. 3 is a further enlarged fragmentary cross-sectional view of the same lure taken along the line 3—3 of FIG. 2.
Figure 2:
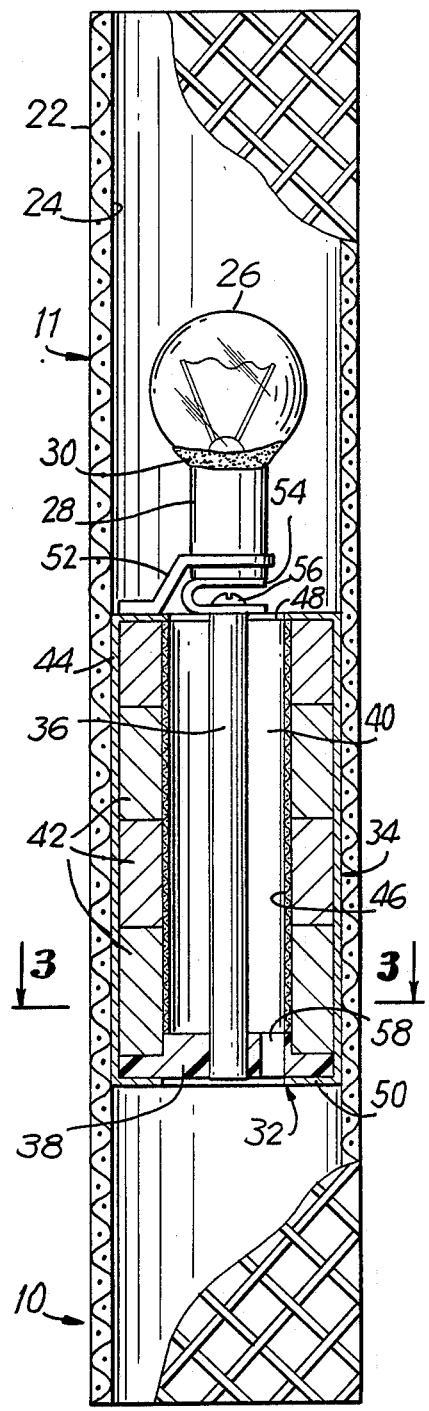
FIG. 2 is an enlarged longitudinal sectional view of the lure of FIG. 1, taken as along the line 2—2 of FIG. 1, but with end portions of the lure body only partly broken away.

The structure of the lure, in the embodiment of FIG. 1, is illustrated in FIGS. 2 and 3. As there shown, the tube or lure body is a length of rigid, axially rectilinear plastic net tubing 22 of cylindrical shape, having a hollow interior, viz. defining a cylindrical longitudinal internal bore 24 open at both ends. Disposed within the tubing 22, at the location 11 (spaced inwardly from both ends of the tube) is an incandescent light bulb 26 of conventional character, mounted in a generally conventional socket 28. The juncture between the light bulb and socket is sealed with hot melt as indicated at 30, to prevent sea water from entering the socket.

Mounted within the tubing 22, rearwardly of the socket 28, is a battery 32 for producing electric current to energize the light bulb 26 when, but only when, the lure 10 is submerged in the ocean or other body of salt water. This battery, in the form shown in FIGS. 2 and 3, comprises an annular cathode structure 34 and a solid cylindrical aluminum anode rod 36 supported coaxially within (and spaced from) the cathode structure 34 by a rigid plastic (i.e. nonconductive) retaining ring member 38 which is itself secured to the cathode structure. Thus, the cathode structure concentrically surrounds the anode but in spaced relation thereto, so that an annular interelectrode gap 40 is defined between the anode and the cathode.

More particularly, the anode structure 34 comprises one or more (preferably four to six) manganese dioxide cathode rings 42 externally enclosed by a cylindrical nickel-plated steel case 44 and retained internally by water-permeable plastic netting 46 secured to the case. Conveniently, the case is formed as a cup, with a centered circular hole 48 cut in its closed end. The manganese dioxide catalyst rings 42 are inserted, one after the other, in this case; the plastic retaining ring 38, supporting the anode rod 36, is next inserted within the case, and finally the open end of the case is peened over the retaining ring as indicated at 50, thereby holding the retaining ring and cathode rings securely in place.

A first rigid metal electric contact member 52 is welded to the end of the case 44 remote from the retaining ring 38, and a second rigid metal electrical contact member 54 is fastened by means of a screw 56 to the aluminum anode rod 36, again at the end thereof remote from the plastic retaining ring 38. The contact member 52 engages and is welded to an electrically conductive side wall portion of the exterior of the socket 28, while the contact member 54 is fixedly secured as by welding to the bottom contact (not shown) of the socket 28. These two electrical contact members 52 and 54 cooperatively support the socket 28 in the electrode portion, thus constituting the mounting for the socket, and also respectively provide electrical connection of the socket (and thus of the bulb 26) respectively to the cathode structure 34 and the anode rod 36.

As will be apparent from the foregoing description, the outer wall of the interelectrode gap 40 is the cylindrical surface made up of the inner surfaces of the succession of manganese dioxide cathode rings 42 over which the water-permeable retaining net 46 extends, while the inner wall of the annular gap 40 is the outer surface of the anode rod 36. This annular gap 40 is open at its forward end through the hole 48, and is also open at its rearward end through a plurality of apertures 58 formed in the retaining ring 38. Thus, the gap 40 is itself a through passage, open at both ends, and extending longitudinally of the tubing 22, to which the anode and cathode surfaces are exposed in spaced relation to each other.

The battery case 44, in which (as described above) the retaining ring 38, anode rod 36, and socket 28 carrying bulb 26 are mounted, is inserted within the central passage 24 of tubing 22 and fixedly bonded to the inner wall of the tube at an intermediate location therein, as shown in FIG. 2. Any suitably strong adhesive material unaffected by water may be used to bond the battery case to the tubing which is, of course, itself electrically nonconductive. If desired, the exterior of the battery case and other exposed metal surfaces may be painted green, to minimize their visibility through the tube and thereby to prevent fish from being distracted away from the location of the hook 18 by light reflected from these metal surfaces through the light-transmissive tube.

As long as the lure is not immersed in water, its battery is not activated, because the interelectrode gap 40 is then merely an air gap containing no electrolyte. Consequently, the shelf life of the lure is virtually unlimited.

When, however, the lure is submerged in the ocean or other body of salt water, the salt water in which it is submerged enters both ends of the tubing 22 and fills the entire interior of the tubing, including the interelectrode gap 40. The manganese dioxide cathode rings and aluminum anode rod respectively function as cathode and anode of a battery when the gap between them, to which their surfaces are exposed, is filled with salt water; i.e., the salt water functions as an electrolyte in the described battery, so as to produce electric current that energizes and lights the bulb 26. The battery continues to be activated and the bulb continues to be lit as long as the lure continues to be submerged in salt water.

Upon removal of the lure from salt water, as when it is reeled in out of the ocean, the salt water which has been acting as the electrolyte of the battery immediately drains out of the interelectrode gap through hole 48 and/or apertures 58, so that the gap 40 becomes once again an air gap without electrolyte, and battery activity ceases. Upon this occurrence, the bulb 26 ceases to emit light.

With each return of the lure to the water, then, entrance of salt water into the gap 40 activates the battery and lights the bulb; each time the lure is removed from the water the battery is deactivated by complete loss of electrolyte, and the bulb goes out, remaining in unlighted condition until the lure is again returned to the water. There is accordingly little or no waste of useful filament lifetime or battery life in emission of light when the lure is not actively in use in a submerged location.

In manganese dioxide-aluminum cells as heretofore known, copious generation of reaction products while the cell is activated has limited the useful cell lifetime. With the present battery, however, such generation of reaction products creates no problem; since the interelectrode gap 40 is open at both ends, salt water flows freely into, through, and out of the gap, flushing away the reaction products. Although at times there may be little flushing action while the lure is quiescently submerged, a vigorous flushing action will occur each time the lure is drawn through the water as it is reeled in.

The estimated lifetime of the bulb and battery unit, using a C-sized cell with an approximate capacity of 4 amp./hrs. and a bulb (such as a No. 131 bulb) drawing 100 ma, is about 40 hours.

Figure 5:
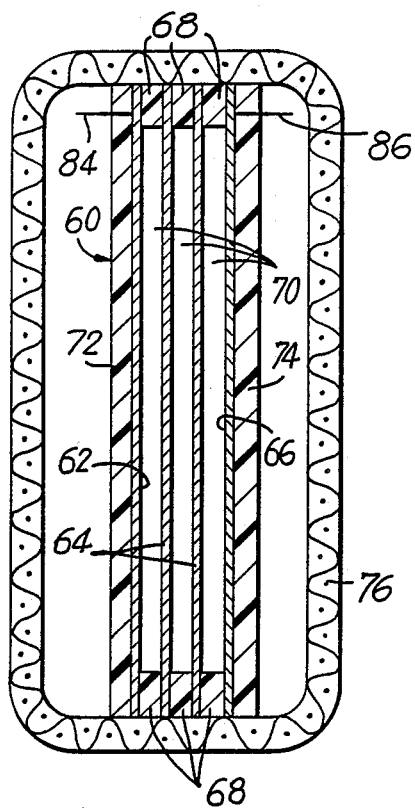
FIG. 5 is a cross-sectional view taken along the line 5—5 of FIG. 4.
Figure 4:
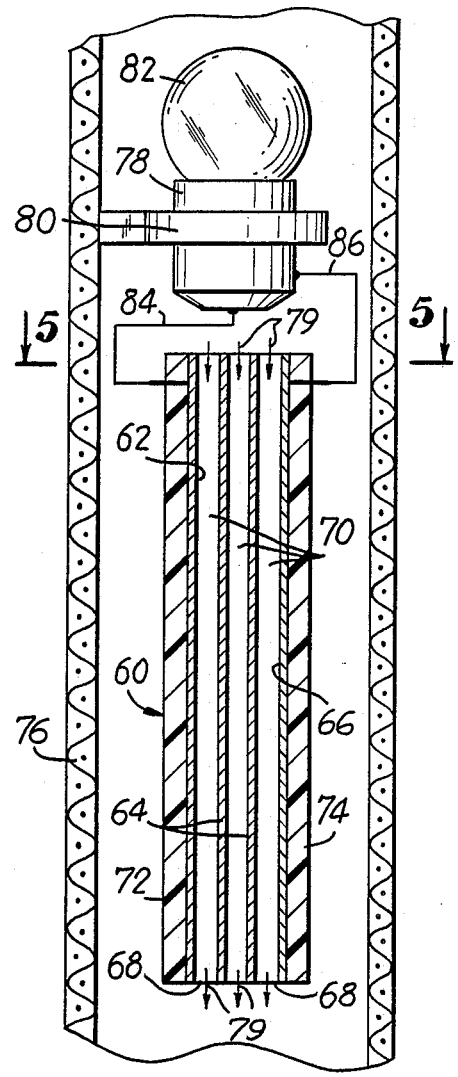
FIG. 4 is a fragmentary schematic longitudinal sectional view of another embodiment of the invention.
Figure 6:
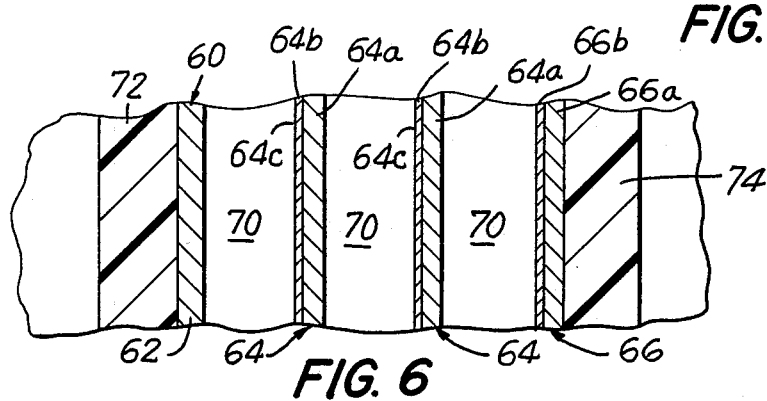
FIG. 6 is an enlarged fragmentary cross-sectional view also taken along the line 5—5 of FIG. 4.

FIGS. 4–6 show an alternative embodiment of the fishing lure of the invention, having a battery 60 constituted of an array of sheet or plate electrodes, including an aluminum sheet anode member 62, a plurality of bipolar sheet electrodes 64 (two such bipolar electrodes being present in the illustrated device), and a platinized sheet steel cathode member 66. These sheet electrodes are disposed in parallel relation to each other in a stack, wherein they are arranged in succession (anode member/first bipolar electrode/second bipolar electrode/cathode member) to form a plurality of cells in series. In the stack, adjacent sheets or plates are spaced apart, by nonconductive plastic spacer members 68 engaging side edge portions of the sheets, so as to define interelectrode gaps or channels 70 having opposed open ends for receiving sea water when the lure is submerged in the ocean; each gap is defined between facing major surfaces of two of the electrode sheets or plates, the latter surfaces being exposed for contact with the sea water, which (as in the device of FIG. 1) constitutes the battery electrolyte. The outer major surfaces of the anode and cathode members (i.e., those surfaces facing away from the battery) are covered with nonconductive plastic caps 72, 74.

The battery 60 is mounted, by means of a suitable adhesive or bonding agent unaffected by salt water, within the interior of a hollow, rigid, light-transmissive plastic net tube 76, which is open at both ends and is generally similar to the tubing 22 of the embodiment of FIG. 1 but is rectangular in cross-section. Within the tube, the battery is so oriented that the electrode sheets extend lengthwise of the tube and the opposed open ends of the gaps 70 respectively face the opposed open ends of the tube; i.e., the gaps extend longitudinally of the tube, and when the lure is submerged, sea water flows into, through, and out of these gaps in a direction (arrows 79) parallel to the long axis of the tube.

Also disposed in the tube 76, forwardly of the battery 60, is an electric lamp socket 78 supported within the tube 64 by a bracket 80 and holding an incandescent light bulb 82. The anode member 62 and the cathode member 66 are respectively electrically connected to the socket base contact by an anode conductor 84 and to the conductive socket wall by a cathode conductor 86.

When the lure is submerged in the ocean, sea water entering the tube 76 fills the tube interior, including the gaps or channels 70, where it functions as an electrolyte to activate the battery 60; electric current is thus produced to energize the light bulb 82 to emit light, visible through the openwork net tube, for attracting fish in the same manner as in the embodiment of FIG. 1. Also as in the FIG. 1 device, the bulb 82 is lighted only when the lure is submerged, because only then is electrolyte (sea water) present in the interelectrode gaps of the battery; and the flow of sea water into and out of the open ends of the gaps flushes away reaction products formed while the battery is activated.

The arrangement of the battery may be further explained with reference to the enlarged fragmentary showing of FIG. 6. As there illustrated, the anode member 62 is an aluminum sheet. Each of the bipolar electrodes 64 is an aluminum sheet 64a having opposed major surfaces, one of which is bare (i.e., exposed aluminum metal) while the other is coated or covered with a layer 64b of nickel. The exposed surface 64c of the nickel layer is in turn coated or plated with a catalyst including platinum. The cathode member 66 includes a steel sheet 66a platinized on its one exposed major surface as indicated at 66b.

At the left-hand side of the battery 60 as seen in FIG. 6, the aluminum anode member 62 faces the catalyst-plated surface of the nickel layer 64b of the left-hand bipolar electrode across the left-hand one of the gaps 70 to constitute a first cell. The exposed aluminum surface of the left-hand bipolar electrode faces the catalyst-plated surface of the nickel layer 64b of the right-hand bipolar electrode across the central one of the gaps 70 to constitute a second cell. The exposed aluminum surface of the right-hand bipolar electrode faces the platinized surface 66b of the cathode member 66 across the right-hand one of the gaps 70 to constitute a third cell. The three cells, as stated, are arranged in series between the anode and cathode conductors.

By way of example, the bipolar electrodes may be fabricated of 0.020 inch gauge aluminum sheet, having one-mil-thick nickel foil bonded to one major surface of the sheet with a conductive cement; alternatively, a commercially available nickel-plated aluminum sheet may be used. The exposed surfaces of the nickel on the bipolar electrodes are etched with hydrochloric acid, and a catalyst layer containing (by weight) 10% platinum and 90% palladium is deposited on the etched nickel by plating from a 2% solution of acidic chlorides of Pt and Pd.

A battery suitable for use in the illuminated fishing lure of FIGS. 4–6 may be constituted of 2-inch-square electrode sheets 62, 64, 64, 66, spaced apart by 1/16-inch-wide gaps 70, the total thickness of the battery (including caps 72 and 74) being, in such case, ⅜ inch. From the standpoint of economy, it is desirable to minimize the gap width, as a decrease in gap width increases the current produced with electrodes of given dimensions (owing to reduction in voltage drop across the gaps); for instance, if the gap width is reduced to 1/32 inch, one-inch-square electrodes (of the described character and arrangement) will produce sufficient current to light the lure. Such reduction in gap width, however, is constrained by the need to keep the gaps wide enough so that they will not become clogged by reaction products formed while the cell is activated, i.e. to enable the gaps to be flushed by flow of salt water into and out of their open ends. The aforementioned 1/16 inch gap width is fully adequate in this respect, although some reduction in gap width may be possible.

It is to be understood that the invention is not limited to the features and embodiments hereinabove specifically set forth but may be carried out in other ways without departure from its spirit.

We claim:

1. A fishing lure comprising
   (a) a fully submersible fishing lure body having a hollow interior open to receive liquid in which the body is submerged, and a light-transmissive wall;
   (b) an electrically energizable light source disposed within said interior to produce light visible through said wall; and
   (c) a battery comprising spaced electrodes mounted in said interior and electrically connected to said light source, said electrodes being so constituted and arranged that, when said body is submerged in salt water and salt water is received in said interior, the electrodes cooperate with the received salt water as an electrolyte to produce electric current for energizing said light source.

2. A lure as defined in claim 1, wherein said electrodes comprise a manganese dioxide cathode and an aluminum anode.

3. A lure as defined in claim 1, wherein said hollow interior is a through passage having opposed open ends and wherein said electrodes cooperatively define at least one interelectrode gap, having opposed open ends, within said passage for permitting flow of the received salt water into, through and out of said gap and said passage to remove therefrom any reaction products formed incident to production of electric current by said battery.

4. A lure as defined in claim 3, wherein said electrodes comprise an annular cathode structure mounted in said body within said passage and a rod-shaped anode, and wherein said battery further includes an electrically nonconductive member secured to said cathode structure and supporting said anode in coaxial spaced relation to said cathode structure, and first and second electrically conductive members respectively connecting said cathode structure and said anode to said light source and cooperatively supporting said light source within said passage.

5. A lure as defined in claim 4, wherein said anode is an aluminum rod and said cathode structure includes an annular manganese dioxide cathode mass and a conductive metal jacket externally surrounding and supporting said mass, said jacket being mounted in said body and being secured to said first conductive member.

6. A lure as defined in claim 3, wherein said body is a rigid, hollow, open-ended plastic net tube and wherein said through passage extends longitudinally within said tube from end to end of said tube.

7. A lure as defined in claim 1, wherein said electrodes include a plurality of bipolar electrodes in sheet or plate form, arranged in a stack between a cathode sheet and an anode sheet to constitute a plurality of cells with adjacent sheets spaced apart to define interelectrode gaps for receiving salt water as electrolyte.

* * * * *